(12) United States Patent
Kuwajima et al.

(10) Patent No.: US 11,967,469 B2
(45) Date of Patent: Apr. 23, 2024

(54) ELECTRONIC COMPONENT CONFIGURED TO RELAX INTERNAL STRESSES DUE TO CHANGES IN TEMPERATURE AND MANUFACTURING METHOD OF THE SAME

(71) Applicant: TDK CORPORATION, Tokyo (JP)

(72) Inventors: Hajime Kuwajima, Tokyo (JP); Takashi Ohtsuka, Tokyo (JP); Takeshi Oohashi, Tokyo (JP); Yuichiro Okuyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 234 days.

(21) Appl. No.: 17/330,929

(22) Filed: May 26, 2021

(65) Prior Publication Data

US 2021/0407737 A1    Dec. 30, 2021

(30) Foreign Application Priority Data

Jun. 25, 2020  (JP) .................................. 2020-109253

(51) Int. Cl.
*H01G 4/40*    (2006.01)
*H01G 4/228*   (2006.01)
*H01G 4/33*    (2006.01)

(52) U.S. Cl.
CPC ............... *H01G 4/40* (2013.01); *H01G 4/228* (2013.01); *H01G 4/33* (2013.01)

(58) Field of Classification Search
CPC ............. H01G 4/228; H01G 4/33; H01G 4/40
See application file for complete search history.

(56) References Cited

U.S. PATENT DOCUMENTS

| 5,643,804 | A  | * | 7/1997  | Arai ........................ H01L 25/16 438/795 |
| 8,324,509 | B2 | * | 12/2012 | Ohtsuka ................... H01L 28/60 174/250 |
| 2007/0109719 | A1 |   | 5/2007  | Kuwajima et al. |
| 2007/0253144 | A1 | * | 11/2007 | Kuwajima ............... H01G 4/33 257/E27.092 |
| 2008/0023219 | A1 |   | 1/2008  | Yoshizawa et al. |
| 2008/0153245 | A1 | * | 6/2008  | Lin ...................... H01L 23/5223 257/E21.003 |
| 2008/0164563 | A1 |   | 7/2008  | Nomura et al. |

(Continued)

FOREIGN PATENT DOCUMENTS

| JP | 2007142109 A    |   | 6/2007  |            |
| JP | 2008034626 A    |   | 2/2008  |            |
| WO | WO-2018212119 A1 | * | 11/2018 | ......... H01F 17/0013 |

*Primary Examiner* — David M Sinclair
(74) *Attorney, Agent, or Firm* — YOUNG LAW FIRM, P.C.

(57) ABSTRACT

Disclosed herein is an electronic component that includes a substrate, a planarizing layer covering a surface of the substrate, a first conductive layer formed on the planarizing layer and having a lower electrode, a dielectric film made of a material different from that of the planarizing layer and covering the planarizing layer and first conductive layer, an upper electrode laminated on the lower electrode through the dielectric film, and a first insulating layer covering the first conductive layer, dielectric film, and upper electrode. An outer periphery of the first insulating layer directly contacts the planarizing layer without an intervention of the dielectric film.

17 Claims, 21 Drawing Sheets

(56) References Cited

U.S. PATENT DOCUMENTS

| | | |
|---|---|---|
| 2008/0186654 A1 | 8/2008 | Takeshima et al. |
| 2017/0230025 A1 | 8/2017 | Kudo et al. |
| 2017/0230026 A1* | 8/2017 | Okura ................ H01G 4/40 |
| 2018/0012698 A1* | 1/2018 | Nakatsuji ........... H01F 27/292 |
| 2018/0040422 A1* | 2/2018 | Shin ................... H01G 4/30 |
| 2019/0074348 A1* | 3/2019 | Ishida ................. H01G 17/00 |
| 2021/0219430 A1 | 7/2021 | Okkuyama et al. |
| 2021/0329773 A1* | 10/2021 | Kikura ............... H05K 1/036 |

* cited by examiner

ELECTRONIC COMPONENT CONFIGURED TO RELAX INTERNAL STRESSES DUE TO CHANGES IN TEMPERATURE AND MANUFACTURING METHOD OF THE SAME

BACKGROUND OF THE INVENTION

Field of the Invention

The present invention relates to an electronic component and a manufacturing method thereof and, more particularly, to an electronic component having a capacitor and a manufacturing method thereof.

Description of Related Art

JP 2007-142109A and JP 2008-34626A disclose an electronic component having a capacitor and an inductor on a substrate. The capacitor described in JP 2007-142109A and JP 2008-34626A includes a lower electrode, a dielectric film that covers the lower electrode, and an upper electrode that faces the lower electrode through the dielectric film. In electronic components of such a type, a good conductor such as copper is used for the material of the upper and lower electrodes, and an inorganic insulating material such as silicon nitride is used for the dielectric film. The lower electrode is covered with an insulating layer made of an organic insulating material such as polyimide through the dielectric film. The organic insulating material such as polyimide has comparatively high adhesion to the silicon nitride, making interfacial peeling between the organic insulating material and the silicon nitride less likely to occur.

However, members constituting the electronic component have mutually different thermal expansion coefficients, causing internal stress due to a change in temperature. Concentration of such stress on the dielectric film made of silicon nitride may cause cracks in the dielectric film or interfacial peeling between the dielectric film and the insulating layer.

SUMMARY

It is therefore an object of the present invention to provide an electronic component capable of relaxing internal stress due to a change in temperature and a manufacturing method for such an electronic component.

An electronic component according to the present invention includes: a substrate; a planarizing layer covering the surface of the substrate; a first conductive layer formed on the planarizing layer and having a lower electrode; a dielectric film made of a material different from that of the planarizing layer and covering the planarizing layer and first conductive layer; an upper electrode laminated on the lower electrode through the dielectric film; and a first insulating layer covering the first conductive layer, dielectric film, and upper electrode, wherein the outer periphery of the first insulating layer directly contacts the planarizing layer, not through the dielectric film.

According to the present invention, the outer periphery of the first insulating layer directly contacts the planarizing layer, so that it is possible to release internal stress due to a change in temperature at the contact point by selecting, as the material of the planarizing layer, a material lower in adhesion to the first insulating layer than the dielectric film to the first insulating layer.

The electronic component according to the present invention may further include a plurality of second conductive layers and a plurality of second insulating layers. The plurality of second conductive and insulating layers are alternately laminated on the first insulating layer. Some of the plurality of second insulating layers may have a cavity. This reduces the volume of the second insulating layers, allowing a reduction in stress to be applied to the second insulating layers. In this case, the plurality of second conductive layers may include a helical shaped conductive pattern constituting an inductor, and the cavity may be positioned within the inner diameter area of the helical shaped conductive pattern in a plan view. Thus, the inductor has an air-core structure, achieving a high self-resonant frequency and exhibiting a high Q-value in high frequency bands. Further, in this case, the planarizing layer may be exposed to the bottom of the cavity. This significantly reduces the volume of the first insulating layer and the plurality of second insulating layers, allowing a significant reduction in stress to be applied to the first insulating layer and the plurality of second insulating layers.

A manufacturing method for an electronic component according to the present invention includes the steps of: covering the surface of a substrate with a planarizing layer; forming, on the planarizing layer, a first conductive layer including a lower electrode; covering the planarizing layer and first conductive layer with a dielectric film made of a material different from that of the planarizing layer; laminating an upper electrode on the lower electrode through the dielectric film; and forming a first insulating layer covering the first conductive layer, dielectric film, and upper electrode after removing the outer periphery of the dielectric film.

According to the present invention, the outer periphery of the dielectric film is removed, so that the outer periphery of the first insulating layer directly contacts the planarizing layer, not through the dielectric film. Thus, it is possible to release internal stress due to a change in temperature at the contact point by selecting, as the material of the planarizing layer, a material lower in adhesion to the first insulating layer than the dielectric film to the first insulating layer.

The manufacturing method for an electronic component according to the present invention may further include a step of alternately laminating a plurality of second conductive layers and a plurality of second insulating layers on the first insulating layer and a step of forming a cavity in some of the plurality of second insulating layers. This reduces the volume of the plurality of second insulating layers, allowing a reduction in stress to be applied to the plurality of second insulating layers.

As described above, according to the present invention, there can be provided an electric component capable of relaxing internal stress due to a change in temperature and a manufacturing method of the same.

BRIEF DESCRIPTION OF THE DRAWINGS

The above features and advantages of the present invention will be more apparent from the following description of certain preferred embodiments taken in conjunction with the accompanying drawings, in which.

BRIEF DESCRIPTION OF THE DRAWINGS

Hereinafter, a preferred embodiment of the present invention will be described in detail with reference to the accompanying drawings.

Figure 1:
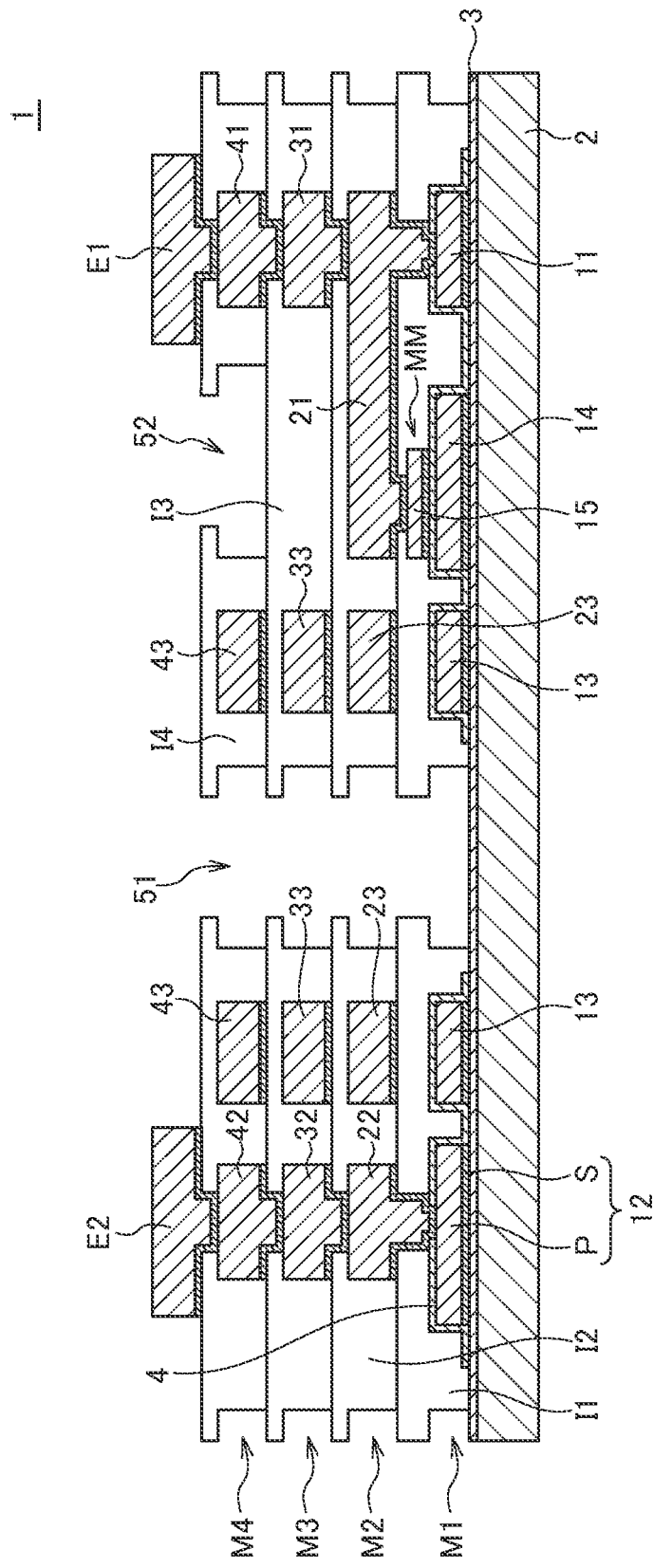
FIG. 1 is a cross-sectional view for explaining the structure of an electronic component 1 according to an embodiment of the present invention.

FIG. 1 is a cross-sectional view for explaining the structure of an electronic component 1 according to an embodiment of the present invention.

The electronic component 1 according to the present embodiment is an LC filter and includes a substrate 2, conductive layers M1 to M4, and insulating layers I1 to I4 as illustrated in FIG. 1. The conductive layers M1 to M4 and insulating layers I1 to I4 are alternately laminated on the upper surface of the substrate 2. The material for the substrate 2 may be any material as long as it is chemically and thermally stable, generates less stress, and can maintain surface smoothness, and examples thereof include, but not particularly limited thereto, silicon single crystal, alumina, sapphire, aluminum nitride, MgO single crystal, $SrTiO_3$ single crystal, surface-oxidized silicon, glass, quartz, and ferrite. The surface of the substrate 2 is covered with a planarizing layer 3. The planarizing layer 3 may be made of, e.g., alumina or silicon oxide. The insulating layers I1 to I4 are made of an organic insulating material such as polyimide.

The conductive layer M1 is a conductive layer positioned in the lowermost layer and includes conductive patterns 11 to 14. The conductive patterns 11 to 14 are each constituted of a thin seed layer S contacting the planarizing layer 3 and a plating layer P having a film thickness larger than that of the seed layer S. Similarly, the conductive patterns positioned in the conductive layers M2 to M4 are each formed of a laminated body of the seed layer S and plating layer P. A barrier layer (not illustrated) may be provided as a foundation of the seed layer S. The conductive pattern 13 has a loop shape in a plan view and constitutes a part of an inductor. The conductive pattern 14 constitutes a capacitor lower electrode and is covered at the upper and side surfaces thereof with a dielectric film (capacitive insulating film) 4 made of, e.g., silicon nitride. The dielectric film 4 is removed at the outer periphery of the electronic component 1, resulting in stress relaxation. The edge of the dielectric film 4 is positioned inside the end portion of the insulating layer I1 and outside the conductive patterns (conductive patterns 11 and 12 in the example of FIG. 1) disposed closest to the outer periphery. As a result, the outer periphery of the insulating layer I1 directly contacts the planarizing layer 3, not through the dielectric film 4.

The insulating layer I1 has comparatively high adhesion to the dielectric film 4 as a nitride film but has low adhesion to the planarizing layer 3 as an oxide film. Thus, interfacial peeling between the insulating layer I1 and the dielectric film 4 is less likely to occur in an element region having the dielectric film 4, whereas in the outer periphery having no dielectric film 4, interfacial peeling between the insulating layer I1 and the planarizing layer 3 is more likely to occur.

The conductive pattern 15 is formed on the upper surface of the conductive pattern 14 through the dielectric film 4. The conductive pattern 15 belongs to a conductive layer MM positioned between the conductive layers M1 and M2 and constitutes a capacitor upper electrode. This forms a capacitor having the lower and upper electrodes constituted by the conductive patterns 14 and 15, respectively. The conductive layers M1 and MM are covered with the insulating layer I1.

The conductive layer M2 is the second conductive layer, which is provided on the surface of the insulating layer I1 and includes conductive patterns 21 to 23. The conductive pattern 21 is connected to the conductive patterns 11 and 15 through openings formed in the insulating layer I1. The conductive pattern 23 has a loop shape in a plan view and constitutes a part of the inductor. The conductive layer M2 is covered with the insulating layer I2.

The conductive layer M3 is the third conductive layer, which is provided on the surface of the insulating layer and includes conductive patterns 31 to 33. The conductive pattern 31 is connected to the conductive pattern 21 through an opening formed in the insulating layer I2. The conductive pattern 32 is connected to the conductive pattern 22 through an opening formed in the insulating layer I2. The conductive pattern 33 has a loop shape in a plan view and constitutes a part of the inductor. The conductive layer M3 is covered with the insulating layer I3.

The conductive layer M4 is the fourth conductive layer, which is provided on the surface of the insulating layer I3 and includes conductive patterns 41 to 43. The conductive pattern 41 is connected to the conductive pattern 31 through an opening formed in the insulating layer I3. The conductive pattern 42 is connected to the conductive pattern 32 through an opening formed in the insulating layer I3. The conductive pattern 43 has a loop shape in a plan view and constitutes a part of the inductor. The conductive layer M4 is covered with the insulating layer I4.

Terminal electrodes E1 and E2 are provided on the upper surface of the insulating layer I4. The terminal electrodes E1 and E2 are connected respectively to the conductive patterns 41 and 42 through openings formed in the insulating layer I4.

As illustrated in FIG. 1, a cavity 51 is formed through the insulating layers I1 to I4, and a cavity 52 is formed through the insulating layer I4. The planarizing layer 3 is exposed to the bottom of the cavity 51, and the insulating layer I3 is exposed to the bottom of the cavity 52. The presence of the cavities 51 and 52 reduces the insulating layers I1 to I4 in volume, which means a reduction in stress to be applied to the insulating layers I1 to I4. Further, the side surfaces of each of the insulating layers I1 to I4 are not flat but have a concavo-convex shape, further reducing the insulating layers I1 to I4 in volume, which further relaxes stress.

Figure 2:
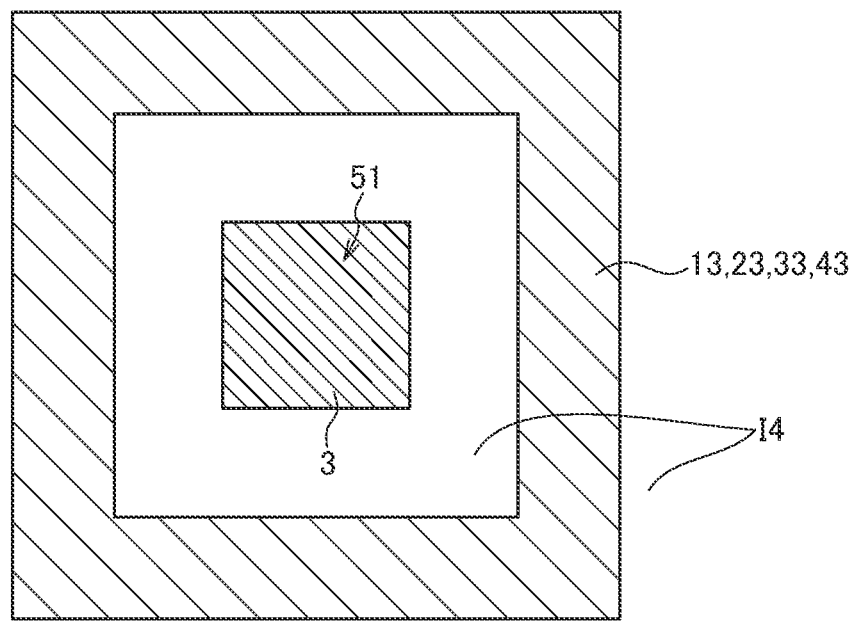
FIG. 2 is a schematic plan view for explaining the planar shape of the conductive patterns 13, 23, 33, and 43.

FIG. 2 is a schematic plan view for explaining the planar shape of the conductive patterns 13, 23, 33, and 43.

As illustrated in FIG. 2, the loop-shaped conductive patterns 13, 23, 33, and 43 are disposed so as to overlap one another and connected to one another through not-shown openings formed in the respective insulating layers 12 to I4. The thus configured conductive patterns 13, 23, 33, and 43 form a helical shaped inductor. The cavity 51 is positioned within the inner diameter area of the helical shaped conductive pattern (conductive patterns 13, 23, 33, and 43). Thus, the inductor has an air-core structure, achieving a high self-resonant frequency and exhibiting a high Q-value in high frequency bands.

Further, in the present embodiment, the outer periphery of the dielectric film 4 is removed, allowing the outer periphery of the insulating layer I1 to directly contact the planarizing layer 3, not through the dielectric film 4. As described above, the insulating layer I1 has a low adhesion to the planarizing layer 3, so that interfacial peeling easily occurs between the insulating layer I1 and the planarizing layer 3 in the outer periphery having no dielectric film 4. Thus, even when internal stress occurs due to a change in temperature, the interfacial peeling occurs between the insulating layer and the planarizing layer 3, releasing the internal stress.

The above effect is more prominent when the conductive layers M1 to M4 and insulating layers I1 to I4 are designed to be thick, or when the numbers of the conductive layers and insulating layers are larger. This is because an increase in the volume of constituent materials increases temperature-dependent dimensional change or internal stress to easily cause peeling in the capacitor, inductor, lead-out wires, and the like. That is, application of a thermal shock or humidity resistance load makes internal stress concentrate on the end portion of the insulating layer, which may generate peeling or crack to be directed inward toward the dielectric film 4. When the peeling or crack occurs in the dielectric film 4, the withstand voltage of the capacitor decreases. On the other hand, in the present embodiment, internal stress is released by the interfacial peeling between the insulating layer I1 and the planarizing layer 3, allowing prevention of peeling or crack of the dielectric film 4. The capacitor also undergoes stress from above; however, in the present embodiment, the presence of the cavity 52 relaxes this stress.

The following describes a manufacturing method for the electronic component 1 according to the present embodiment.

FIGS. 3 to 12 are process views for explaining the manufacturing method for the electronic component 1 according to the present embodiment. Although many pieces of the electronic components 1 are obtained from an aggregate substrate in the manufacturing process of the electronic component 1, the following description will focus on the manufacturing process of one electrode component 1.

Figure 3:
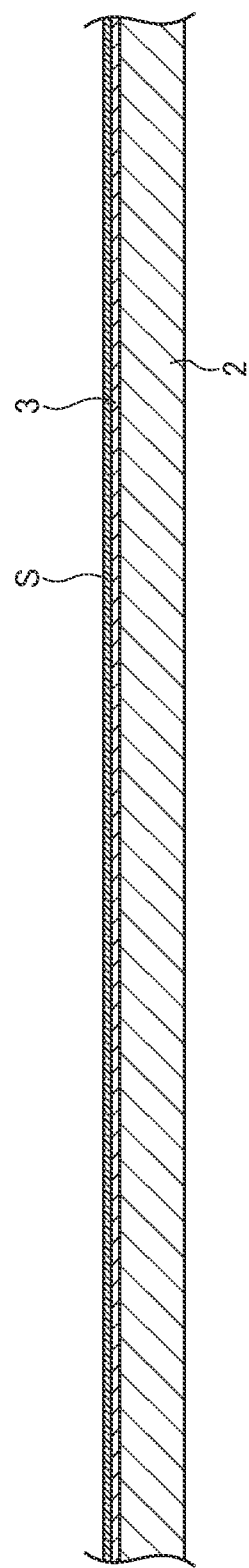
FIGS. 3 to 12 are process views for explaining the manufacturing method for the electronic component 1 according to the embodiment of the present invention.
Figure 4:
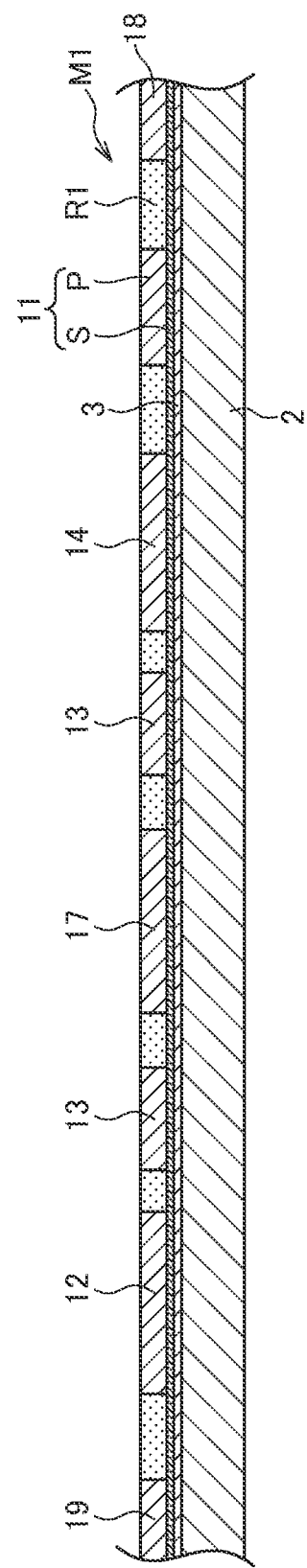
Figure 5:
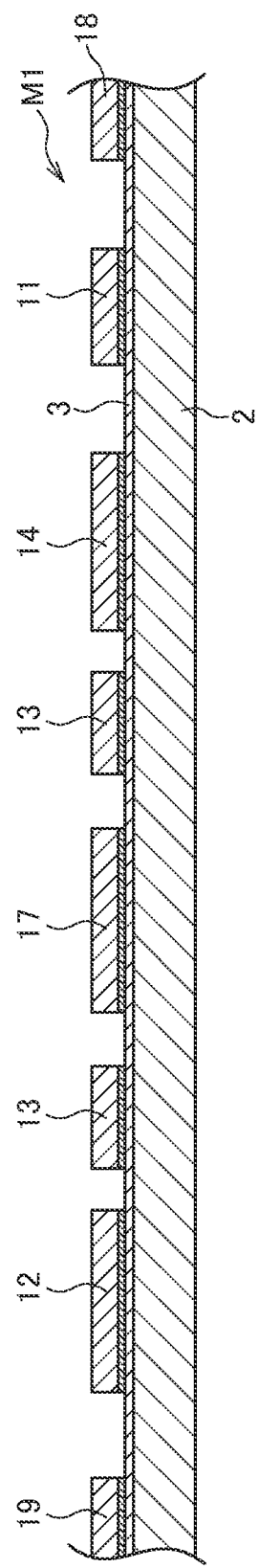

As illustrated in FIG. 3, the planarizing layer 3 is formed by sputtering or the like on the substrate (aggregate substrate) 2, and the surface of the planarizing layer 3 is subjected to grinding or mirror finishing such as CMP for planarization. Thereafter, the seed layer S is formed by sputtering or the like on the surface of the planarizing layer 3. A barrier layer may be provided as a foundation of the seed layer S. Subsequently, as illustrated in FIG. 4, a resist layer R1 is spin-coated on the seed layer S and then patterned so as to expose a part of the seed layer S on which the conductive layer M1 is to be formed. In this state, electrolyte plating is performed using the seed layer S as a feeder to form a plating layer P on the seed layer S. A laminated body of the seed layer S and plating layer P constitutes the conductive layer M1. In the cross section illustrated in FIG. 4, the conductive layer M1 includes the conductive patterns 11 to 14 and sacrificial patterns 17 to 19. Then, as illustrated in FIG. 5, the resist layer R1 and the exposed seed layer S are removed sequentially, whereby the conductive layer M1 is completed. The removal of the seed layer S can be achieved by etching or ion milling.

Figure 6:
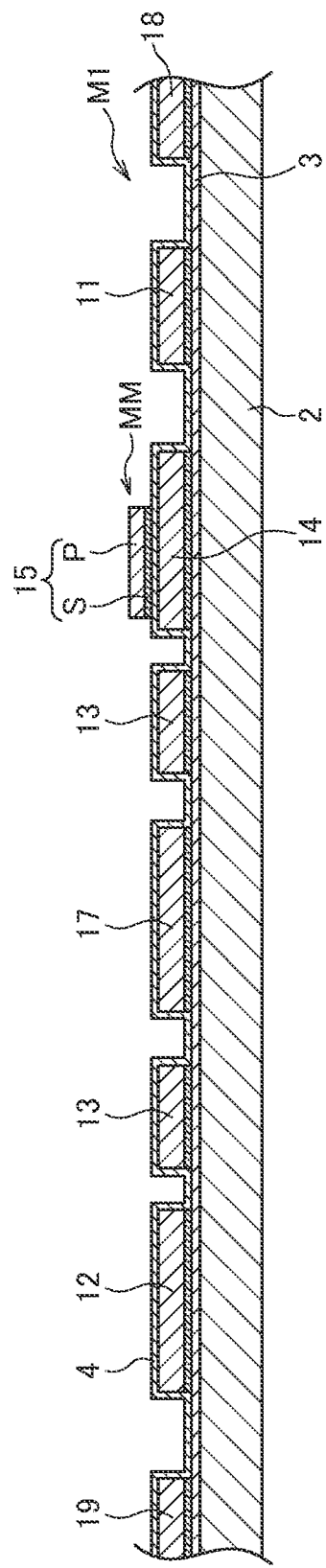

Then, as illustrated in FIG. 6, the dielectric film 4 is formed on the entire surface of the conductive layer M1 including the upper and side surfaces thereof. The dielectric film 4 can be formed by sputtering, plasma CVD, MOCVD, sol-gel, electron beam vapor deposition, or the like. Then, the conductive pattern 15 is formed on the upper surface of the conductive pattern 14 through the dielectric film 4 using the same method as the formation method for the conductive layer M1. The conductive pattern 15 is also formed of a laminated body of the seed layer S and plating layer P. This completes the conductive layer MM to thereby form a capacitor having the lower and upper electrodes constituted by the conductive patterns 14 and 15, respectively. Although not particularly limited, it is preferable to make the film thickness of the conductive layer MM smaller than that of the conductive layer M1. This increases processing accuracy of the conductive layer MM to reduce a variation in capacitance due to processing accuracy.

Figure 7:
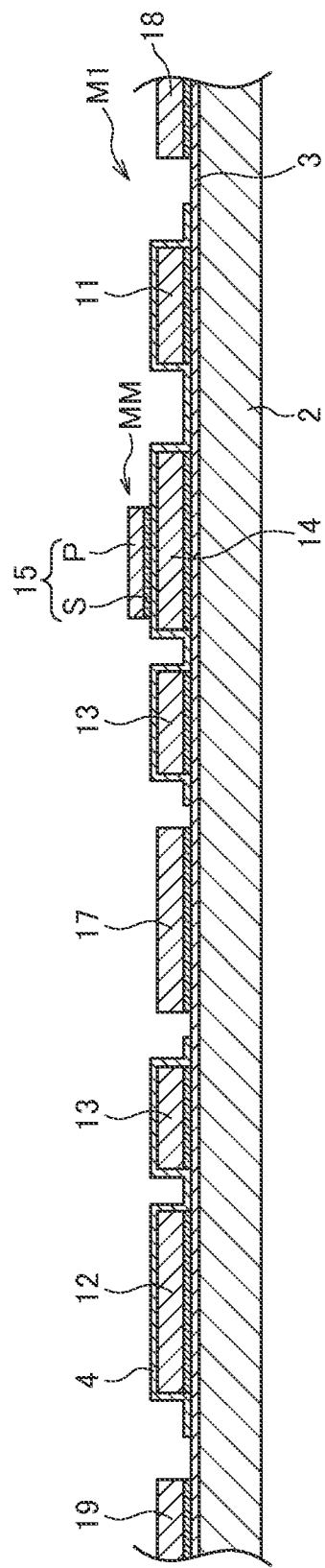

Then, as illustrated in FIG. 7, the dielectric film 4 is patterned to expose the sacrificial patterns 17 to 19 and also to expose the planarizing layer 3 to be finally positioned at the outer periphery of the electronic component 1. The dielectric film 4 can be patterned by ion milling or the like.

Figure 8:
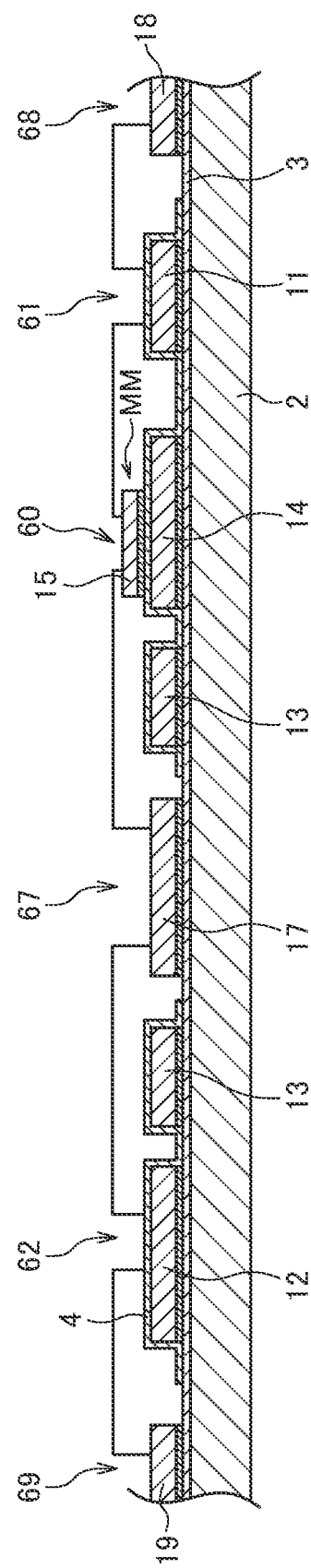

Then, as illustrated in FIG. 8, the insulating layer I1 covering the conductive layers M1 and MM is formed, followed by patterning of the insulating layer I1 to form the openings 60 to 62 and 67 to 69 in the insulating layer I1. As a result, the conductive pattern 15 is exposed through the opening 60, the sacrificial patterns 17 to 19 are exposed respectively through the openings 67 to 69, and the dielectric film 4 covering the upper surfaces of the conductive patterns 11 and 12 are exposed respectively through the openings 61 and 62.

Figure 9:
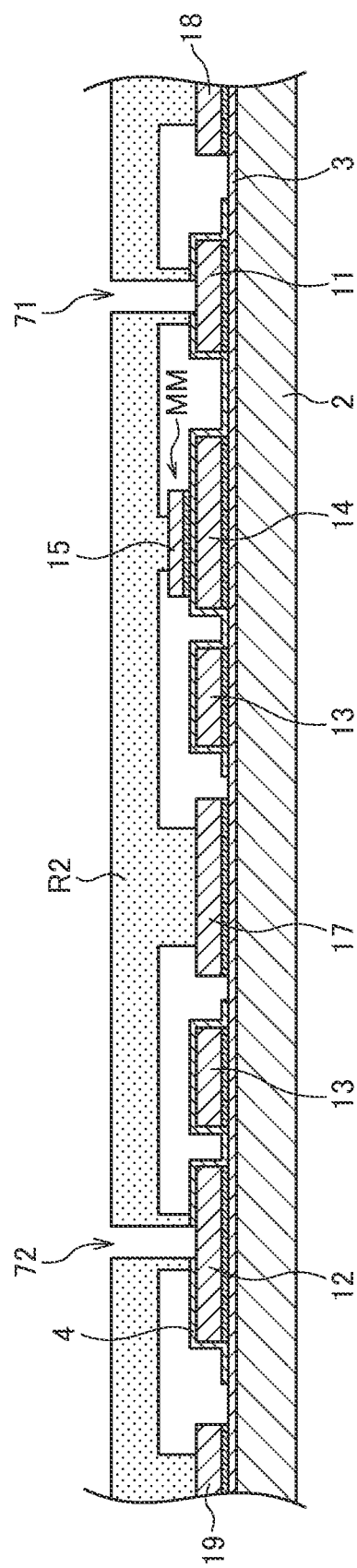

Then, as illustrated in FIG. 9, a resist layer R2 is formed on the insulating layer I1, followed by formation of openings 71 and 72 in the resist layer R2. As a result, the dielectric film 4 covering the upper surfaces of the conductive patterns 11 and 12 is exposed through the openings 71 and 72. In this state, ion milling or the like is applied to remove the dielectric film 4 exposed to the openings 71 and 72 to expose the upper surfaces of the conductive patterns 11 and 12.

Figure 10:
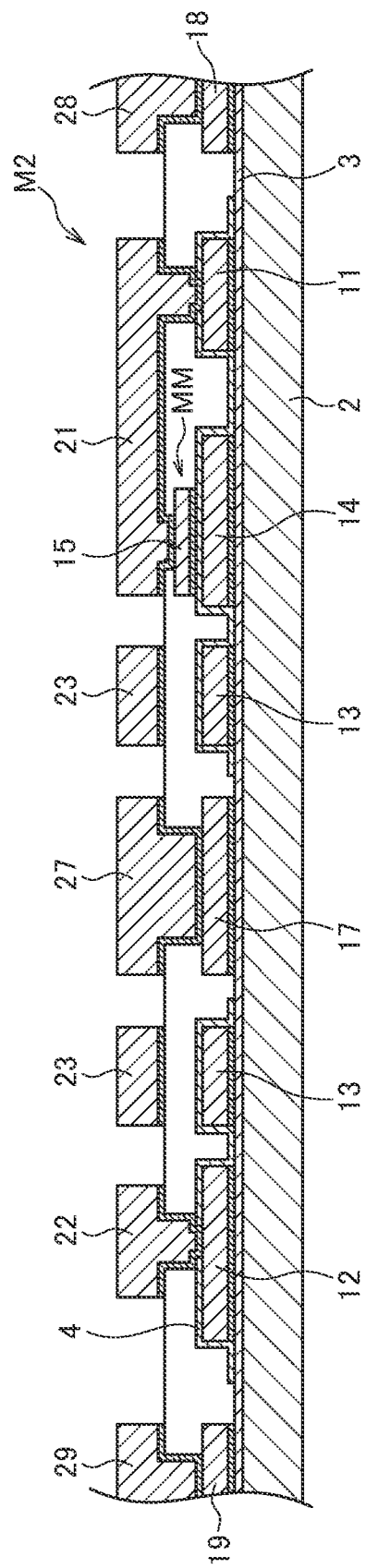

Then, as illustrated in FIG. 10, the resist layer R2 is removed, and then the conductive layer M2 is formed on the insulating layer I1 using the same method as the formation method for the conductive layer M1. In the cross section illustrated in FIG. 10, the conductive layer M2 includes the conductive patterns 21 to 23 and sacrificial patterns 27 to 29. The conductive patterns and sacrificial patterns constituting the conductive layer M2 are each also formed of a laminated body of the seed layer S and plating layer P. The conductive pattern 21 is connected to the conductive patterns 11 and 14 through the openings formed in the insulating layer I1, the conductive pattern 22 is connected to the conductive pattern 12 through the opening formed in the insulating layer I1, and the sacrificial patterns 27 to 29 are connected respectively to the sacrificial patterns 17 to 19 through openings formed in the insulating layer I1.

Figure 11:
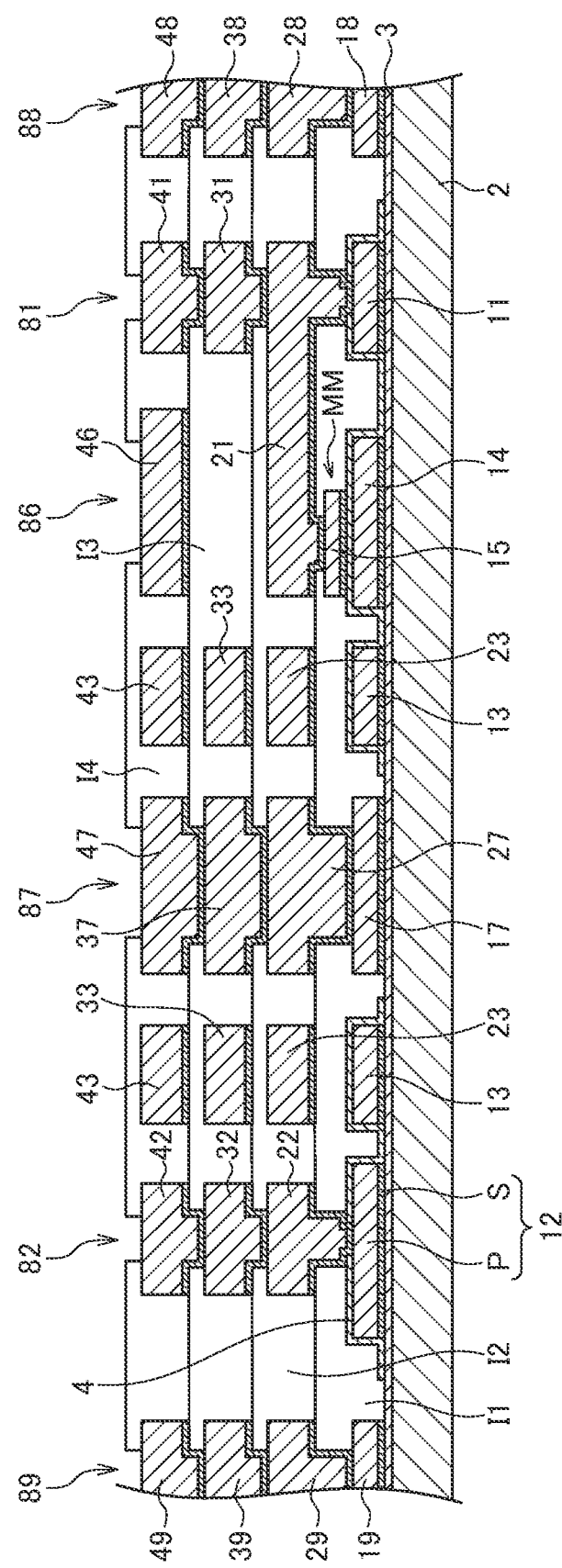

Thereafter, the same processes are repeated to form the insulating layer 12, conductive layer M3, insulating layer 13, conductive layer M4, and insulating layer I4 in this order as illustrated in FIG. 11. In the cross section illustrated in FIG. 11, the conductive layer M3 includes the conductive patterns 31 to 33 and sacrificial patterns 37 to 39, and the conductive layer M4 includes the conductive patterns 41 to 43 and sacrificial patterns 46 to 49. The conductive patterns 31 and 32 are connected respectively to the conductive patterns 21 and 22 through the openings formed in the insulating layer 12, and the sacrificial patterns 37 to 39 are connected respectively to the sacrificial patterns 27 to 29 through openings formed in the insulating layer 12. The conductive patterns 41 and 42 are connected respectively to the conductive patterns 31 and 32 through the openings formed in the insulating layer 13, and the sacrificial patterns 47 to 49 are connected respectively to the sacrificial patterns 37 to 39 through openings formed in the insulating layer 13.

Figure 12:
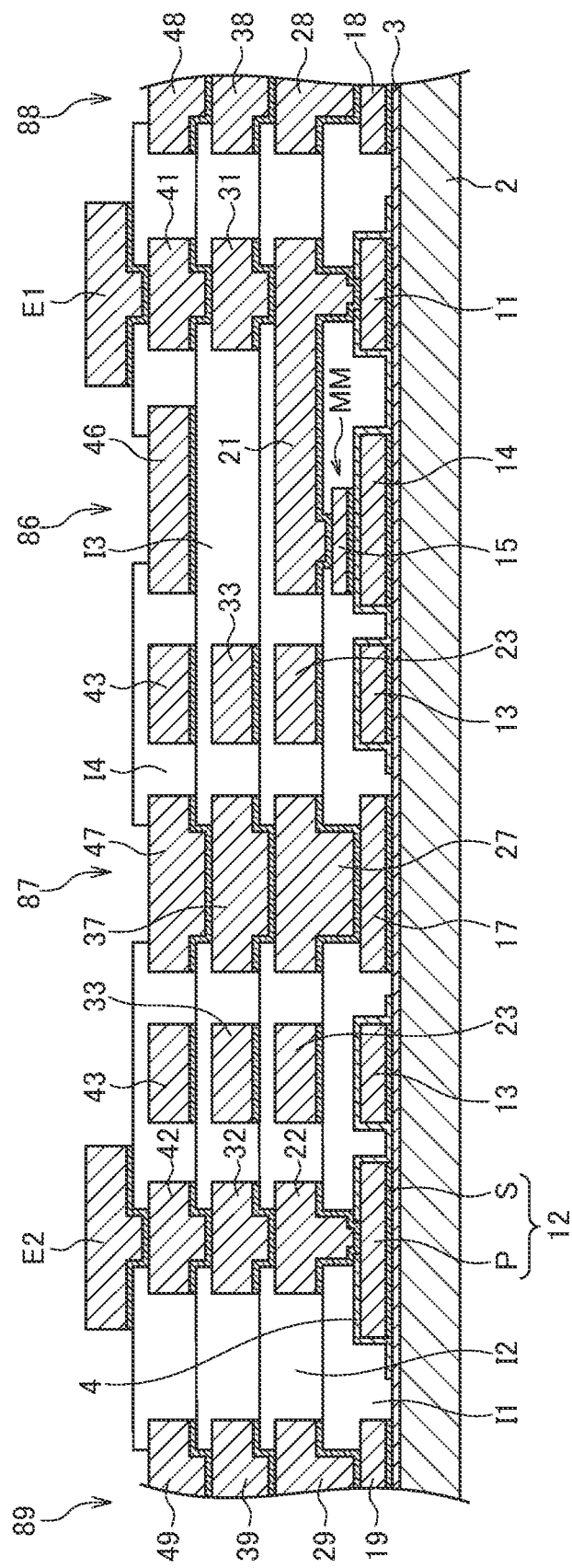

Then, the insulating layer I4 is patterned to form openings 81, 82, and 86 to 89. As a result, the conductive patterns 41 and 42 are exposed respectively through the openings 81 and 82, and the sacrificial patterns 46 to 49 are exposed respectively through the openings 86 to 89. Subsequently, the terminal electrodes E1 and E2 are formed as illustrated in FIG. 12. The terminal electrode E1 is connected to the conductive pattern 41 through the opening formed in the insulating layer I4, and the terminal electrode E2 is connected to the conductive pattern 42 through the opening formed in the insulating layer I4. No conductor is formed on the openings 86 to 89.

Then, chemical etching is performed with the terminal electrodes E1 and E2 covered with a not-shown mask to thereby remove the sacrificial patterns 17 to 19, 27 to 29, 37 to 39, and 46 to 49. As a result, the cavity 51 is formed in the area of the sacrificial patterns 17, 27, 37, and 47 having been removed, and the cavity 52 is formed in the area of the sacrificial pattern 46 having been removed.

Then, the substrate 2 is cut along the area of the sacrificial patterns 18, 28, 38, and 48 having been removed, and the area of the sacrificial patterns 19, 29, 39, and having been removed to individualize the electronic components 1. As a result, the electronic component 1 according to the present embodiment is completed.

As described above, in the manufacturing method for the electronic component 1 according to the present embodiment, the sacrificial patterns 18, 19, 28, 29, 38, 39, 48, and 49 positioned on the dicing line are removed, so that even when the insulating layers I1 to I4 are large in thickness, a load to be applied to a dicing blade is significantly reduced, allowing the electronic components 1 to be easily individualized. Further, the dielectric film 4 on the dicing line is removed ahead of time, so that the dielectric film 4 is not subjected to dicing damage. Furthermore, the sacrificial patterns 17, 27, 37, 46, 47 are removed to form the cavities 51 and 52, thus reducing the volume of the insulating layers I1 to I4.

Figure 13:
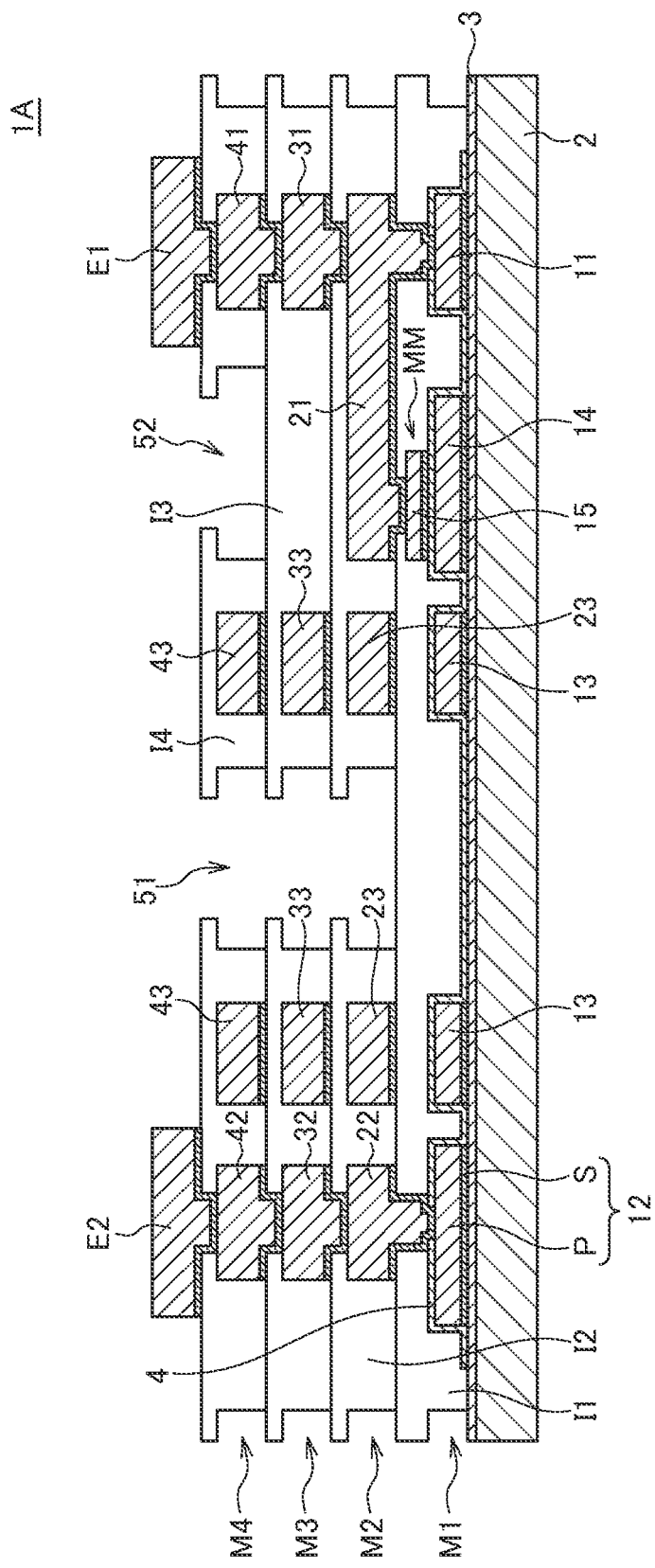
FIG. 13 is a cross-sectional view for explaining the structure of an electronic component 1A according to a first modification.

FIG. 13 is a cross-sectional view for explaining the structure of an electronic component 1A according to a first modification.

The electronic component 1A illustrated in FIG. 13 differs from the electronic component 1 illustrated in FIG. 1 in that the insulating layer I1 has no cavity 51. Other basic configurations are the same as those of the electronic component 1 of FIG. 1, so the same reference numerals are given to the same elements, and overlapping description will be omitted. As exemplified by the electronic component 1A according to the first modification, the planarizing layer 3 need not necessarily be exposed to the bottom of the cavity 51.

Figure 14:
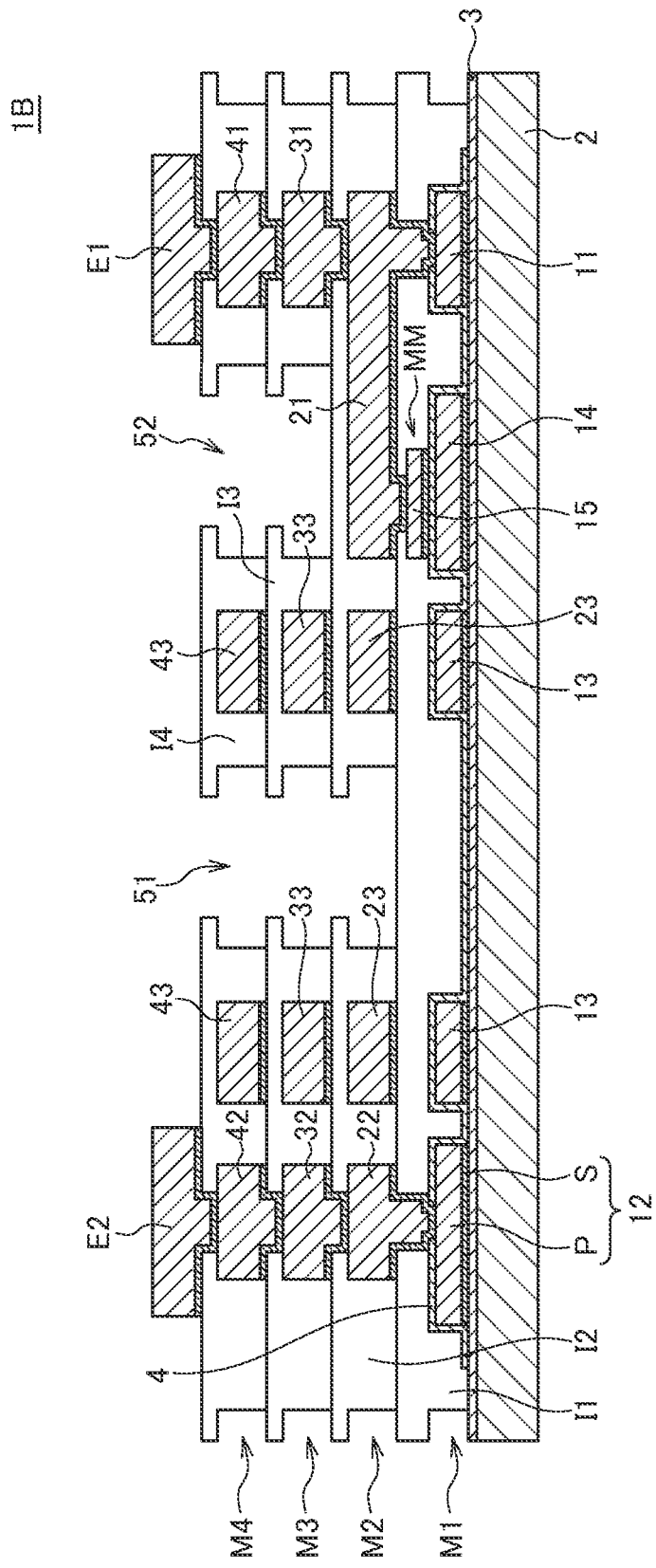
FIG. 14 is a cross-sectional view for explaining the structure of an electronic component 1B according to a second modification.

FIG. 14 is a cross-sectional view for explaining the structure of an electronic component 1B according to a second modification.

The electronic component 1B illustrated in FIG. 14 differs from the electronic component 1A illustrated in FIG. 13 in that the insulating layer 13 has the cavity 52. Other basic configurations are the same as those of the electronic component 1A of FIG. 13, so the same reference numerals are given to the same elements, and overlapping description will be omitted. As exemplified by the electronic component 1B according to the second modification, the cavity 52 may be formed over a plurality of insulating layers.

Figure 15:
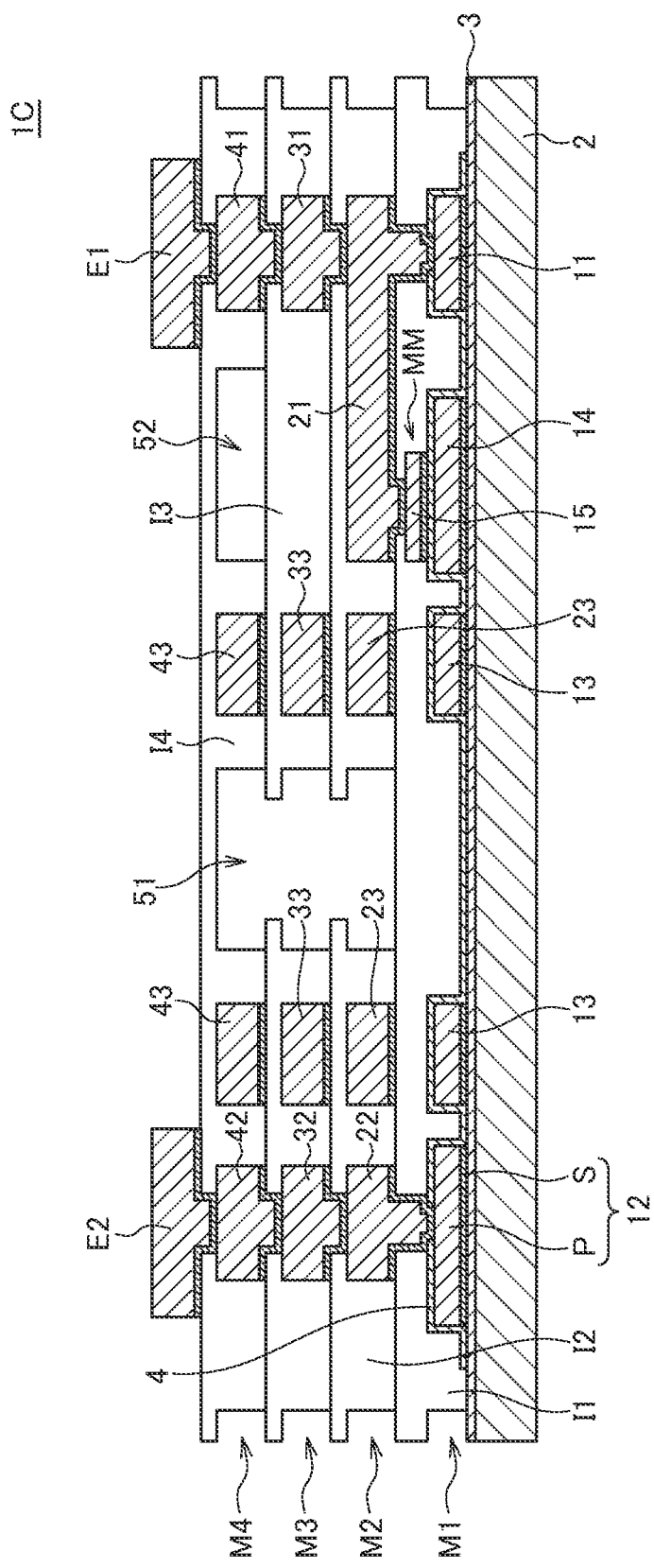
FIG. 15 is a cross-sectional view for explaining the structure of an electronic component 1C according to a third modification.

FIG. 15 is a cross-sectional view for explaining the structure of an electronic component 1C according to a third modification.

The electronic component 1C illustrated in FIG. 15 differs from the electronic component 1A illustrated in FIG. 13 in that the upper sides of the cavities 51 and 52 are covered with the insulating layer I4. Other basic configurations are the same as those of the electronic component 1A of FIG. 13, so the same reference numerals are given to the same elements, and overlapping description will be omitted. As exemplified by the electronic component 1C according to the third modification, the upper sides of the cavities 51 and 52 may be covered with the insulating layer.

Figure 16:
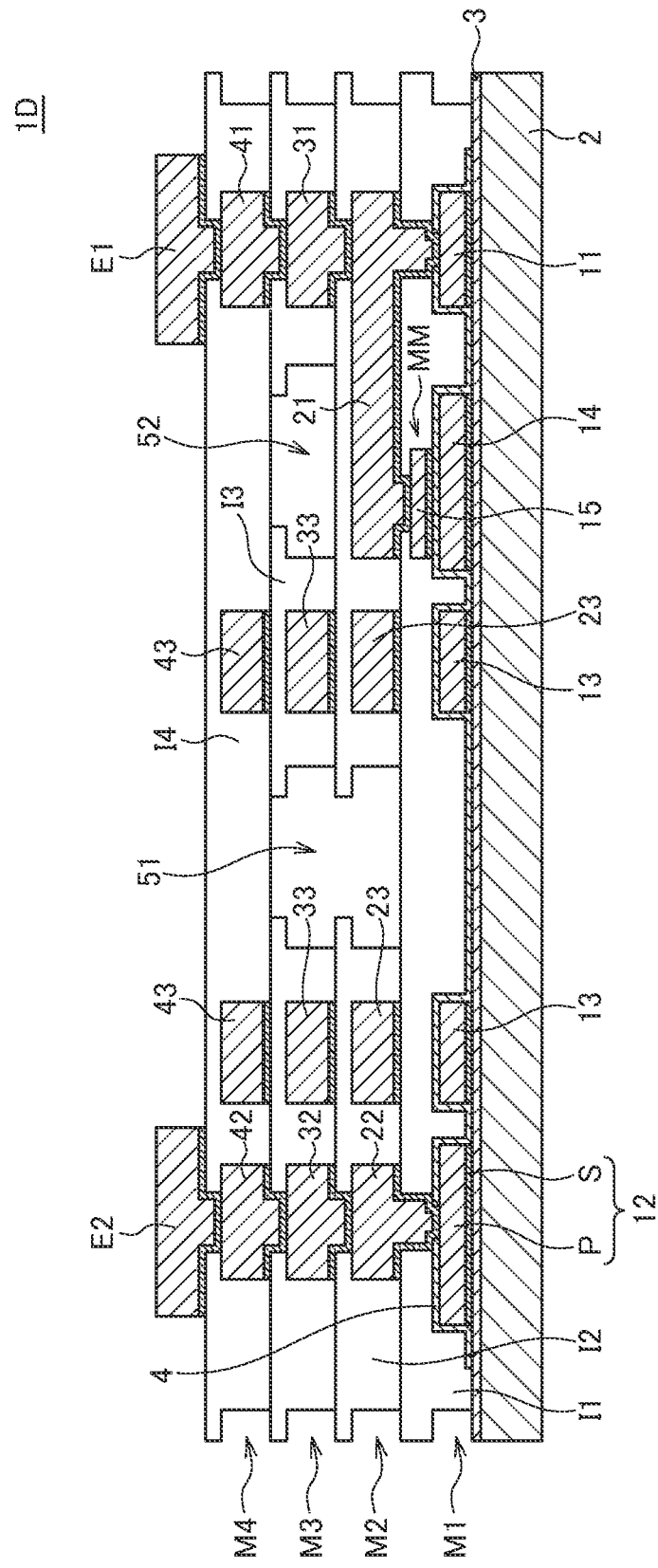
FIG. 16 is a cross-sectional view for explaining the structure of an electronic component 1D according to a fourth modification.

FIG. 16 is a cross-sectional view for explaining the structure of an electronic component 1D according to a fourth modification.

The electronic component 1D illustrated in FIG. 16 differs from the electronic component 1B illustrated in FIG. 14 in that the cavities 51 and 52 are not formed in the insulating layer I4. Other basic configurations are the same as those of the electronic component 1B of FIG. 14, so the same reference numerals are given to the same elements, and overlapping description will be omitted. As exemplified by the electronic component 1D according to the fourth modification, the cavities 51 and 52 may be absent in the insulating layer I4.

Figure 17:
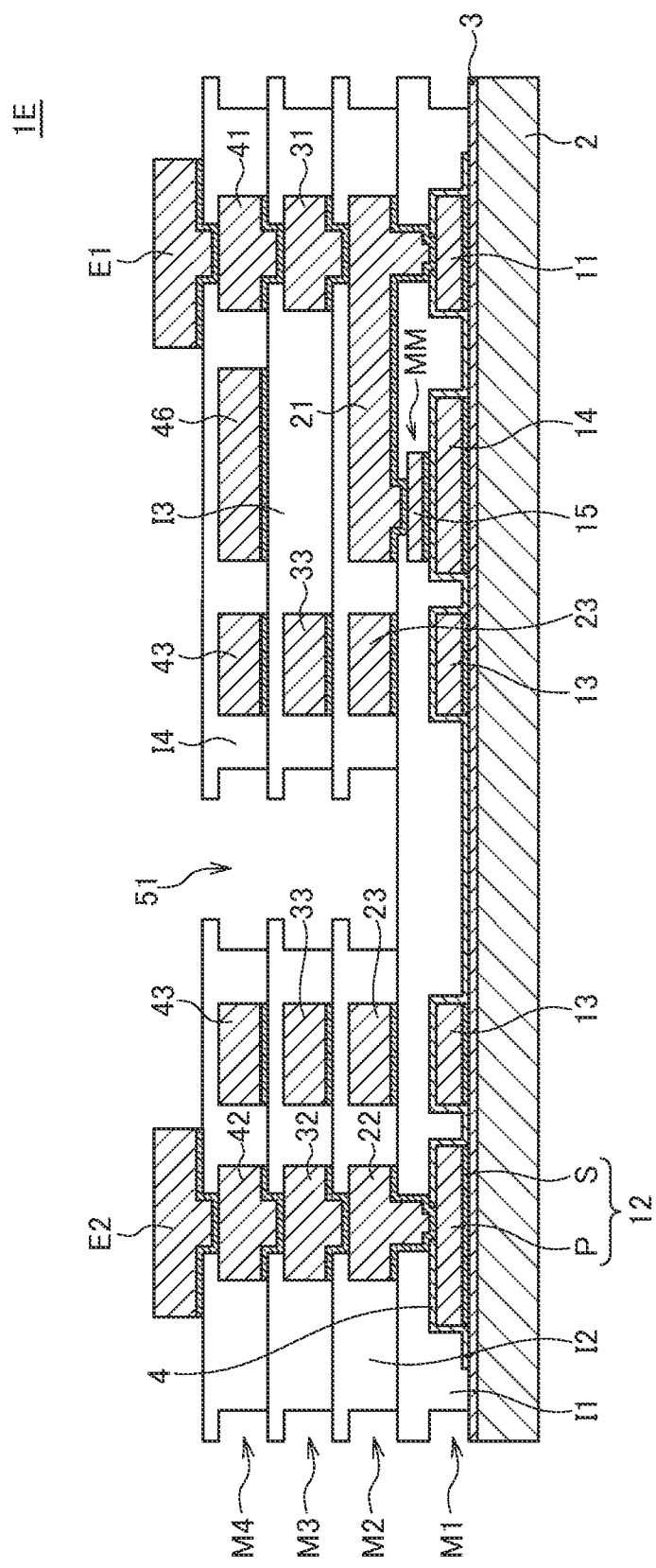
FIG. 17 is a cross-sectional view for explaining the structure of an electronic component 1E according to a fifth modification.

FIG. 17 is a cross-sectional view for explaining the structure of an electronic component 1E according to a fifth modification.

The electronic component 1E illustrated in FIG. 17 differs from the electronic component 1A illustrated in FIG. 13 in that the cavity 52 is not formed, but the sacrificial pattern 46 remains. Other basic configurations are the same as those of the electronic component 1A of FIG. 13, so the same reference numerals are given to the same elements, and overlapping description will be omitted. As exemplified by the electronic component 1E according to the fifth modification, some sacrificial patterns may be made to remain.

Figure 18:
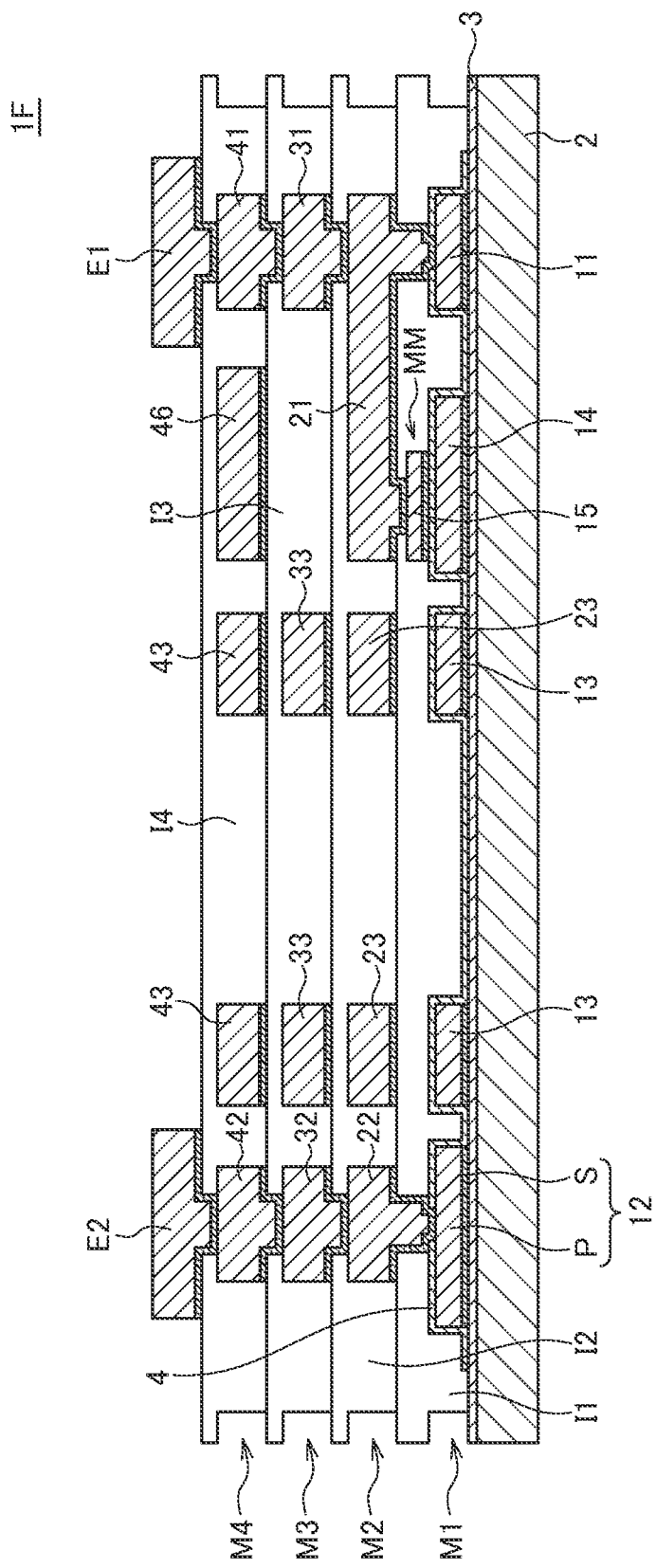
FIG. 18 is a cross-sectional view for explaining the structure of an electronic component 1F according to a sixth modification.

FIG. 18 is a cross-sectional view for explaining the structure of an electronic component 1F according to a sixth modification.

The electronic component 1F illustrated in FIG. 18 differs from the electronic component 1E illustrated in FIG. 17 in that the cavity 51 is not formed and instead the inner diameter areas of the helical shaped conductive pattern (conductive patterns 13, 23, 33, and 43) are filled with the insulating layers I1 to I4. Other basic configurations are the same as those of the electronic component 1E of FIG. 17, so the same reference numerals are given to the same elements, and overlapping description will be omitted. As exemplified by the electronic component 1F according to the sixth modification, the cavity need not necessarily be formed in the inner diameter area of the helical shaped conductive pattern.

Figure 19:
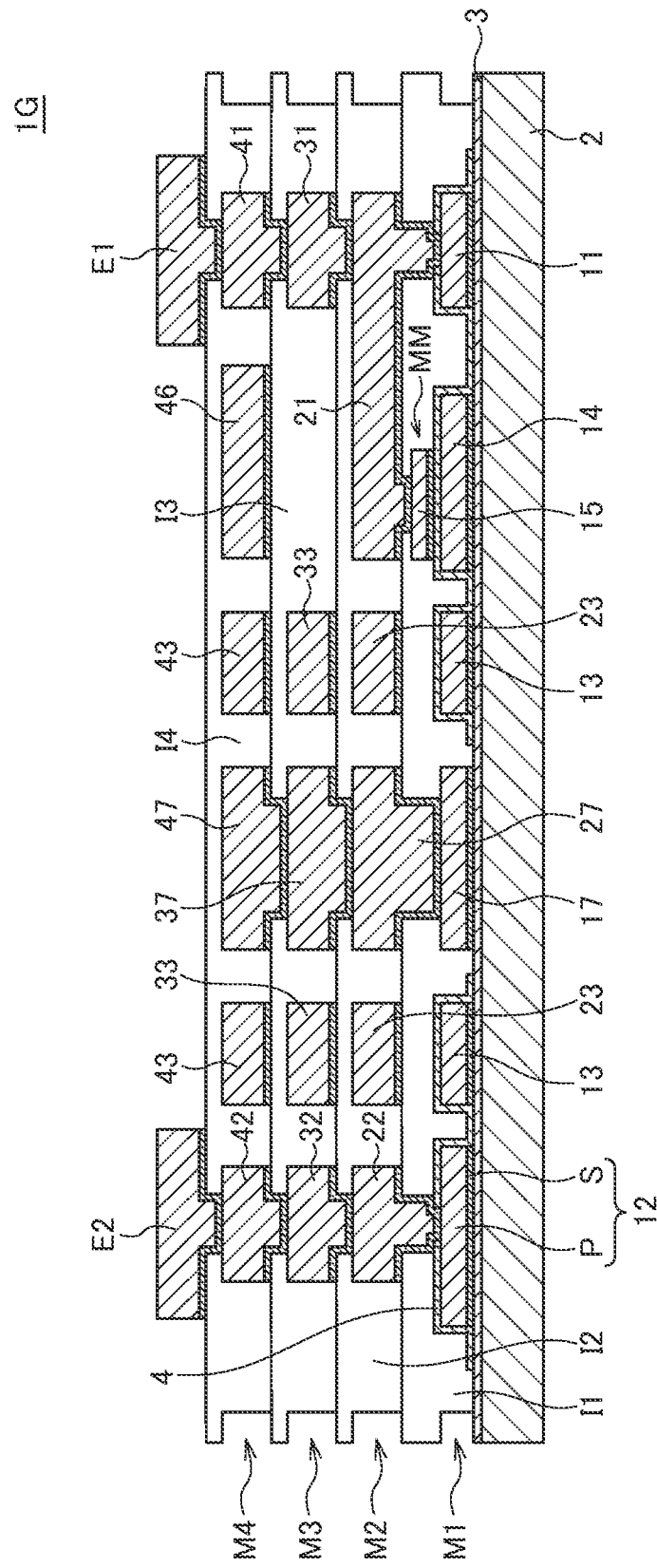
FIG. 19 is a cross-sectional view for explaining the structure of an electronic component 1G according to a seventh modification.

FIG. 19 is a cross-sectional view for explaining the structure of an electronic component 1G according to a seventh modification.

The electronic component 1G illustrated in FIG. 19 differs from the electronic component 1E illustrated in FIG. 17 in that the cavity 51 is not formed, but the sacrificial patterns 17, 27, 37, and 47 remain. Other basic configurations are the same as those of the electronic component 1E of FIG. 17, so the same reference numerals are given to the same elements, and overlapping description will be omitted. As exemplified by the electronic component 1G according to the seventh modification, the sacrificial pattern may remain in the inner diameter area of the helical shaped conductive pattern.

Figure 20:
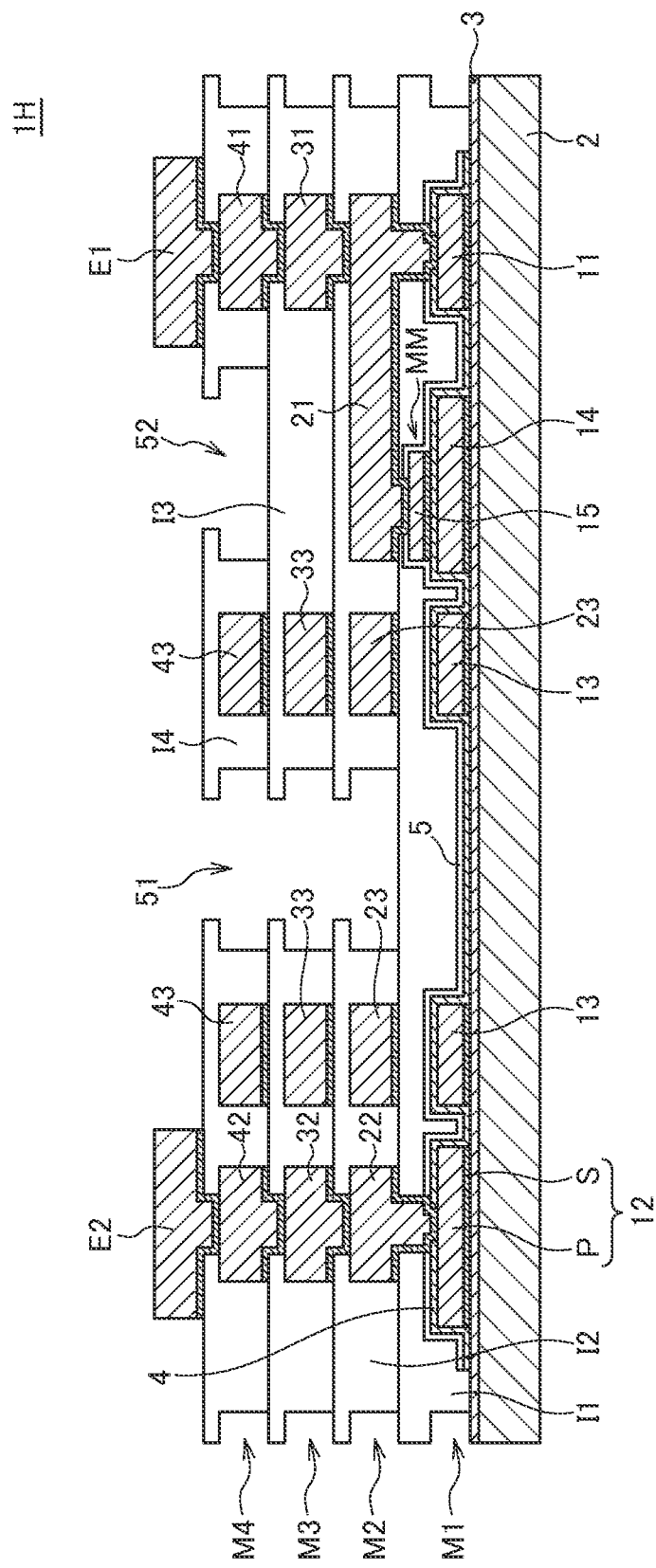
FIG. 20 is a cross-sectional view for explaining the structure of an electronic component 1H according to an eighth modification.

FIG. 20 is a cross-sectional view for explaining the structure of an electronic component 1H according to an eighth modification.

The electronic component 1H illustrated in FIG. 20 differs from the electronic component 1A illustrated in FIG. 13 in that the surface of the dielectric film 4 and the surface of the conductive pattern 15 as the upper electrode are covered with a passivation film 5. Other basic configurations are the same as those of the electronic component 1A of FIG. 13, so the same reference numerals are given to the same elements, and overlapping description will be omitted. The passivation film 5 may be made of the same material as that of the dielectric film 4. Covering the surfaces of the dielectric film 4 and conductive pattern 15 with the passivation film 5 allows achievement of a capacitor structure having a high degree of air-tightness and a high insulating property.

Figure 21:
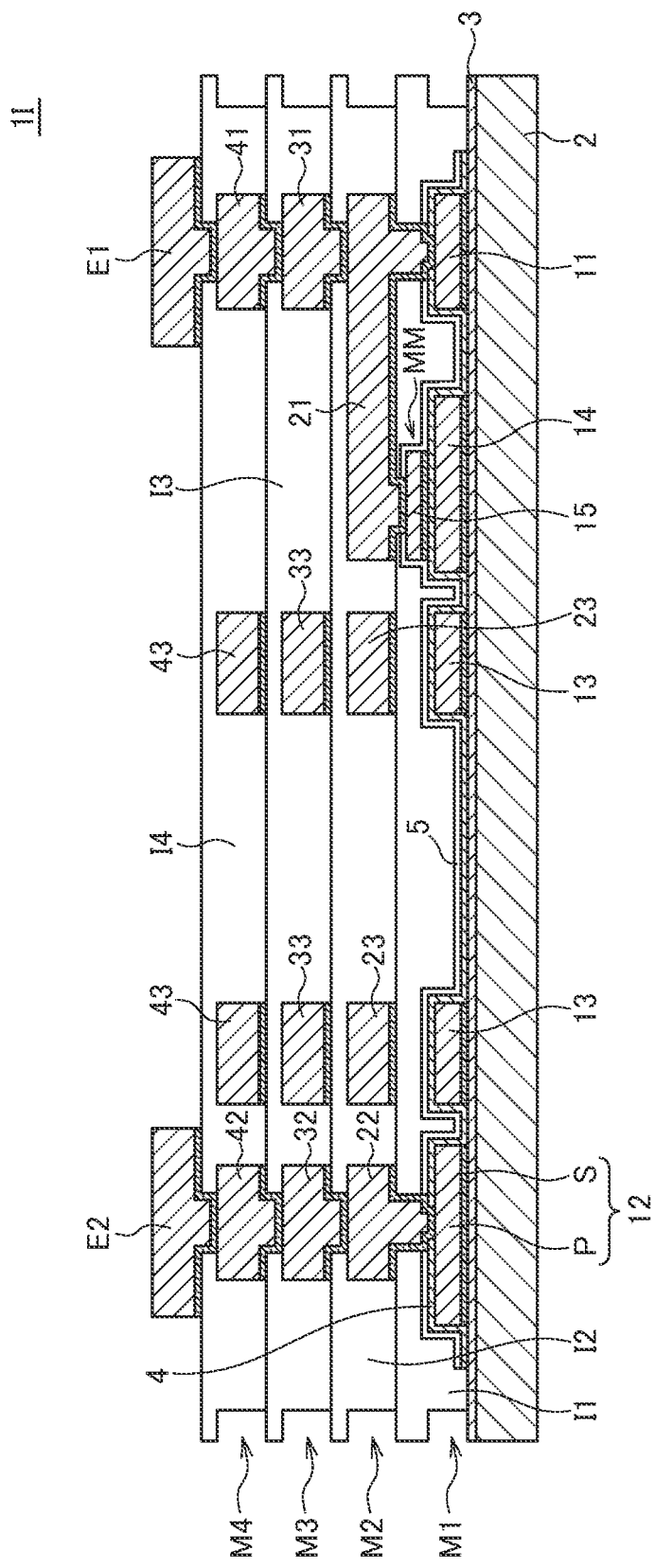
FIG. 21 is a cross-sectional view for explaining the structure of an electronic component 1I according to a ninth modification.

FIG. 21 is a cross-sectional view for explaining the structure of an electronic component 1I according to a ninth modification.

The electronic component 1I illustrated in FIG. 21 differs from the electronic component 1H illustrated in FIG. 20 in that the cavities 51 and 52 are not formed at all. Other basic configurations are the same as those of the electronic component 1H of FIG. 20, so the same reference numerals are given to the same elements, and overlapping description will be omitted. As exemplified by the electronic component 1I according to the ninth modification, both the cavities 51 and 52 may be completely omitted.

It is apparent that the present invention is not limited to the above embodiments, but may be modified and changed without departing from the scope and spirit of the invention.

For example, although the present invention is applied to an LC filter in the above embodiment, the electronic component as the subject matter of the present invention is by no means limited in application to the LC filter, and may be applied to electronic components of other types, such as those combined with an LCR element.

Further, the planarizing layer 3, dielectric film 4, and insulating layer I1 may be made of any materials as long as the adhesion between the planarizing layer 3 and the insulating layer I1 is lower than the adhesion between the dielectric film 4 and the insulating layer I1.

What is claimed is:

1. An electronic component comprising:
 a substrate;
 a planarizing layer covering a surface of the substrate;
 a first conductive layer directly formed on the planarizing layer, the first conductive layer including a lower electrode and a loop shaped conductive pattern;
 a dielectric film made of a material different from that of the planarizing layer, the dielectric film directly covering the lower electrode, the loop shaped conductive pattern, and a part of the planarizing layer located between the lower electrode and the loop shaped conductive pattern;
 an upper electrode laminated on the lower electrode through the dielectric film; and
 a first insulating layer covering the first conductive layer, dielectric film, and upper electrode,
 wherein an outer periphery of the first insulating layer directly contacts the planarizing layer without an intervention of the dielectric film, and
 wherein a part of the planarizing layer surrounded by the loop shaped conductive pattern includes a first region covered with the dielectric film, a second region covered with the first insulating layer without an intervention of the dielectric film.

2. The electronic component as claimed in claim 1, further comprising a plurality of second conductive layers and a plurality of second insulating layers alternately laminated on the first insulating layer,
 wherein some of the plurality of second insulating layers have a cavity.

3. The electronic component as claimed in claim 2,
 wherein the plurality of second conductive layers include a helical shaped conductive pattern connected to the loop shaped conductive pattern, and
 wherein the cavity is positioned within the inner diameter area of the helical shaped conductive pattern in a plan view.

4. The electronic component as claimed in claim 3, wherein the planarizing layer is exposed to a bottom of the cavity.

5. The electronic component as claimed in claim 1, wherein the first region surrounds the second region.

6. The electronic component as claimed in claim 5, wherein the part of the planarizing layer surrounded by the loop shaped conductive pattern further includes a third region exposed without being covered by the dielectric film and the first insulating layer.

7. The electronic component as claimed in claim 6, wherein the second region surrounds the third region.

8. The electronic component as claimed in claim 1,
 wherein the first conductive layer further includes an additional conductive pattern covered with the dielectric film, and
 wherein the additional conductive pattern is connected to the upper electrode.

9. The electronic component as claimed in claim 8, wherein another part of the planarizing layer located between the lower electrode and the additional conductive pattern is covered with the dielectric film.

10. A method of manufacturing an electronic component, the method comprising:
 covering a surface of a substrate with a planarizing layer;
 forming, on the planarizing layer, a first conductive layer including a lower electrode and a loop shaped conductive pattern;
 covering the planarizing layer and first conductive layer with a dielectric film made of a material different from that of the planarizing layer;
 laminating an upper electrode on the lower electrode through the dielectric film; and
 removing a part of the dielectric film formed on an outer periphery of the planarizing layer without removing another part of the dielectric film formed between the lower electrode and the loop shaped conductive pattern; and forming a first insulating layer covering the first conductive layer, dielectric film, and upper electrode after the removing.

11. The method of manufacturing an electronic component as claimed in claim 10, further comprising:
   alternately laminating a plurality of second conductive layers and a plurality of second insulating layers on the first insulating layer; and
   forming a cavity in some of the plurality of second insulating layers.

12. An electronic component comprising:
   a first insulating film comprising a silicon oxide formed on a substrate;
   a first conductive layer directly formed on the first insulating film, the first conductive layer including a first conductive pattern having an upper surface and a side surface and a first inductor pattern having an upper surface and a side surface;
   a second insulating film comprising a silicon nitride directly formed on the first insulating film and upper and side surfaces of each of the first conductive pattern and the first inductor pattern; and
   a first insulating layer comprising an organic material, the first insulating layer having a first region that is in contact with the second insulating film and a second region surrounding the first region, the second region being in contact with the first insulating film,
   wherein the first insulating layer has a cavity surrounded by the first inductor pattern such that a part of the first insulating film is exposed,
   wherein the cavity includes a lower section exposing the part of the first insulating film and an upper section located above the lower section, and
   wherein the lower section is greater in diameter than the upper section.

13. The electronic component as claimed in claim 12, wherein the first insulating layer comprising polyimide.

14. The electronic component as claimed in claim 12, further comprising a second conductive pattern formed on the first conductive pattern via the second insulating film so that the first and second conductive patterns and the second insulating film constitute a capacitor element,
   wherein the first and second conductive patterns are embedded in the first insulating layer.

15. The electronic component as claimed in claim 12, further comprising:
   a second conductive layer formed on the first insulating layer; and
   a second insulating layer embedding the second conductive layer,
   wherein the second insulating layer has a cavity.

16. The electronic component as claimed in claim 15, wherein second insulating layer has a second inductor pattern surrounding the cavity.

17. The electronic component as claimed in claim 12, wherein a height of the lower section of the cavity is substantially a same as a height of the first conductive layer.

* * * * *